United States Patent
Yamada et al.

(10) Patent No.: US 6,242,071 B1
(45) Date of Patent: Jun. 5, 2001

(54) METHOD FOR ASSEMBLING CERAMIC HONEYCOMB STRUCTURE, AND SUPPORTING MEMBER THEREFOR

(75) Inventors: Toshio Yamada; Toshihiko Hijikata; Mikio Tanaka, all of Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/271,156

(22) Filed: Mar. 17, 1999

(30) Foreign Application Priority Data

Mar. 3, 1998 (JP) .................................................. 10-084626

(51) Int. Cl.[7] ........................................................ B32B 3/12
(52) U.S. Cl. .............................. 428/116; 428/73; 29/436; 29/446; 29/505; 29/522.1
(58) Field of Search ..................................... 428/116, 118, 428/73; 29/436, 446, 505, 522.1; 501/527.19

(56) References Cited

U.S. PATENT DOCUMENTS

| 3,975,273 | * | 8/1976 | Shaltz et al. | ............................. 210/74 |
| 4,014,184 | * | 3/1977 | Stark | ...................................... 61/1 V |
| 4,093,423 | | 6/1978 | Neumann . | |
| 4,631,269 | | 12/1986 | Lachman et al. . | |

FOREIGN PATENT DOCUMENTS

| 196 18 656 | 11/1997 | (DE) . |
| 0 685 636 | 12/1995 | (EP) . |
| 7-77036 | 3/1995 | (JP) . |
| 8-61054 | 3/1996 | (JP) . |
| 8-93464 | 4/1996 | (JP) . |

\* cited by examiner

Primary Examiner—Francis J. Lorin
(74) Attorney, Agent, or Firm—Parkhurst & Wendel, LLP

(57) ABSTRACT

To provide a durable catalytic converter or heat exchanger to be used in an exhaust gas cleaning-up system for an internal combustion engine or the like.

A durable catalytic converter, heat exchanger or the like is provided by use of a supporting member provided with a low-friction layer to smoothly assemble a ceramic honeycomb structure in a metallic can.

8 Claims, 1 Drawing Sheet

METHOD FOR ASSEMBLING CERAMIC HONEYCOMB STRUCTURE, AND SUPPORTING MEMBER THEREFOR

BACKGROUND OF THE INVENTION AND RELATED ART STATEMENT

The present invention relates to a method for producing a catalytic converter and heat exchanger used in an exhaust gas cleaning-up system for an internal combustion engine or the like, and a member to be used in the method, more particularly to the method for assembling a ceramic honeycomb structure wound with a low-friction supporting member into a metallic can while compressing the supporting member, and to the supporting member of low friction for the honeycomb structure when producing the catalytic converter and heat exchanger.

Various methods have been proposed to assemble a ceramic honeycomb structure, which is vulnerable to mechanical shocks, into a metallic protective structure. One of the common methods is the so-called clamshell method, in which a pair of symmetric half shell whose form is mutually symmetrical is welded to each other to contain a ceramic structure. Another method is rolling, in which a ceramic honeycomb structure is wound with a supporting member and further with a metallic plate forming a cylinder, and the overlapping ends of the plate are welded to each other, to form a protective structure. Still another method is intrusion, in which a honeycomb structure is intruded together with a supporting member into a cylindrical, metallic protective structure.

Each of these methods, however, has its own disadvantages. The clamshell method involves, for example, a durability-related problem. Density of the supporting member tends to decrease in the vicinity of the welding line of the clamshell, because of the limitation set by the welding. This lower-density section will be attacked more notably by the exhaust gases than are the other sections of the supporting member and hence deteriorated more, with the result that it may not be able to absorb mechanical shocks sufficiently, possibly leading to damages of the honeycomb structure while in service, including sudden destruction, and preventing it from exhibiting its inherent functions. Wind erosion originating from the welded section is another problem involved in this method.

Rolling may not be highly suitable for industrial purposes, because it needs more welding labor than the clamshell method.

Intrusion is superior to the above two methods in that it needs no welding work. A mat of ceramic fibers as the supporting member is put into a metallic can by the aid of a dedicated jig, because of large friction between the mat and can. At present, however, it is difficult for this method to put the supporting member into the can sufficiently uniformly in density to make the honeycomb structure it protects resistant to repeated attacks by the exhaust gases, when they are in service in a catalytic converter.

For example, production of a catalytic converter of an intruded honeycomb structure, disclosed by Japanese Patent Application Laid-Open No. 7-77036, needs a retainer ring to prevent misalignment of the honeycomb axes, because a mat as the supporting member alone is difficult to support the honeycomb structure uniformly at a high surface pressure, which evolves when the mat is highly compressed to increase friction resistance.

However, use of a retainer ring to prevent axial misalignment partially closes the honeycomb ends, causing partial loss of performance of the exhaust gas cleaning-up system. The adverse effect it causes is similar to that resulting from projection of the mat from a honeycomb end.

It is therefore highly demanded to develop an intrusion method which allows a honeycomb structure to be held by a mat alone at a sufficient surface pressure to support them, without needing a device, such as retainer ring, to prevent axial misalignment of the honeycombs.

SUMMARY OF THE INVENTION

It is an object of the present invention to provide a method for assembling a ceramic honeycomb structure into a metallic can as the protective structure without causing the problems involved in the above mentioned prior art, and also to provide a supporting member to be used for the honeycomb structure. In other words, it is an object to provide a method for assembling the honeycomb structure which is supported sufficiently durably to cause no problems, e.g., gas channeling, when used in an exhaust gas system or heat exchanger for an internal combustion engine or the like.

It is considered that intrusion is a more preferable assembling method than the others in durability of the honeycomb structure. The applicants of the present invention have proposed a catalytic converter composed of ceramic honeycomb structure, supported by a mat of ceramic fibers having specific properties and assembled by intrusion (Japanese Patent Application Laid-open No. 7-77036). This intrusion method, however, is demanded to be further developed to allow commercial production of the catalytic converters to be achieved faster and more perfectly, because several practical problems are involved in this method, such as time-consuming intrusion works and mat misalignment troubles acceleratedly increasing as intrusion rate is increased. This intrusion work may be referred to as canning in this specification.

When a honeycomb structure is held by a relatively thick supporting member or assembled into a metallic can at a high surface pressure generated by compressing the supporting member in an attempt to place more importance on their durability, excessive friction may evolve between the intrusion jig and can structure, causing misalignment between the honeycomb structure and supporting member, and making it difficult to uniformly put the honeycomb structure in the can. When the misaligned assembly of the honeycomb structure and supporting member is forcefully put in the can, part of the structure may not be evenly supported, or the member may not sufficiently cover the honeycomb structure. This may cause various troubles. Gas channeling will occur at a honeycomb section which is not sufficiently supported. Moreover, such a section will be exposed to repeated mechanical shocks and no longer sustain the honeycomb structure. Uneven pressure may damage the honeycomb structure. When the supporting member extends beyond the honeycomb structure, flow of exhaust gases into the ceramic honeycomb structure will be partly prevented by the supporting member, causing pressure drop across the structures to increase. Increased pressure drop will cause various engine troubles, when the structure is used for an exhaust gas cleaning-up system, such as increased engine load, engine stalling in an extreme case, decreased fuel economy and engine drivability, and increased pollutant emissions.

The applicants of the present invention have found, by extensive studies to solve the above problems, that an assembly of ceramic honeycomb structure and supporting member can be put into a metallic can without causing the above problems, e.g., uneven coverage of the supporting member over the honeycomb structure as a result of partial misalignment of the assembly occurring while it is put in the can, and protrusion of the member beyond the honeycomb structure, when the honeycomb structure wound with the compressed supporting member is put into the can with a low-friction layer on the supporting member surface in contact with the metallic can, reaching the present invention.

This invention provides a method for intruding a ceramic honeycomb structure wound with a supporting member into a metallic can while compressing the supporting member, where the supporting member is provided with a low-friction layer on the surface in contact with the metallic can.

This invention also provides a member for a catalytic converter or heat exchanger, assembled by the above method to be used in an exhaust gas cleaning-up system for an internal combustion engine or boiler, which is produced in a manner mentioned above.

This invention also provides a member to support a ceramic honeycomb structure for the above purposes, which is provided with a low-friction layer on the surface in contact with the metallic can.

DETAILED DESCRIPTION OF PREFERRED EMBODIMENT

Figure 1:
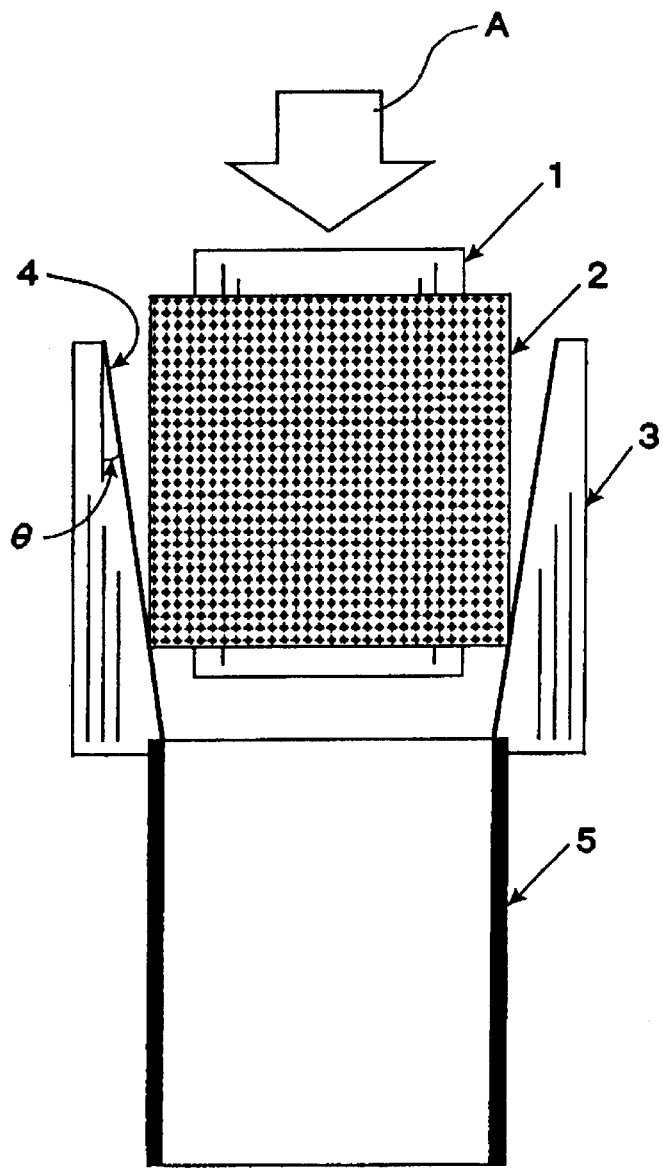
FIG. 1 is a sectional view which schematically illustrates the canning method of the present invention by intrusion.

The method for assembling, by intrusion, a ceramic honeycomb structure held by a supporting member into a metallic can as the protective structure for the honeycomb structures is characterized by use of the supporting member which is provided with a low-friction layer on the surface in contact with the metallic can. The low-friction layer surface preferably has a static coefficient of friction of 0.15 or lower, determined as per JIS K-7125, more preferably 0.1 or lower. It goes without saying that the ideal static coefficient of friction is zero, but it is generally difficult to have a coefficient of 0.01 or lower from material limitations.

The low-friction layer having the above static coefficient of friction is formed on a mat of ceramic fibers, generally of ceramic materials, commonly used as the supporting member for honeycomb structures. The mat can be provided with the low-friction layer with or without an adhesive layer in-between. The low-friction layer may be paper or synthetic paper which is optionally treated with synthetic resin, oil or the like showing lubricity by coating or immersion. The mat of ceramic fibers may be also provided, directly or indirectly via an adhesive layer, with the low-friction layer of synthetic resin, e.g., silicon resin, optionally incorporated with an additive, e.g., silica, or immersed in a solution which contains the above. Various types of synthetic adhesives may be used for the adhesive layer. An adhesive in the form of liquid or gel is spread over the low-friction layer and/or mat of ceramic fibers, before they are adhered to each other by pressing. An adhesive in the form of film is placed between the low-friction layer and mat of ceramic fibers, before they are fast adhered to each other by pressing.

The mat of ceramic fibers as the base for the supporting member is composed of the fibers having a diameter of 2 $\mu$m or more but below 6 $\mu$m, where the ceramic material is selected from at least one of the group consisting of alumina, silica, mullite, silicon carbide, silicon nitride and zirconia.

The mat preferably has a nominal thickness of 5 to 30 mm before being pressed, bulk density of 0.05 to 0.5 g/cm$^3$, and compressive characteristics which allow the mat to generate a surface pressure of around 1 kgf/cm$^2$ when pressed at the initial surface pressure of 2 kgf/cm$^2$ at room temperature and then heated to 1000° C., in accordance with the procedure described in Japanese Patent Application Laid-open No. 7-20 77036.

Examples of this type of mat of ceramic fibers include Mufftec (produced by Mitsubishi Chemical) and Interum (produced by 3 M).

The low-friction layer to be formed on the mat of ceramic fibers preferably has a static coefficient of friction of 0.15 or lower, determined as per JIS K-7125, more preferably 0.1 or lower. Any material described in the first paragraph on page 7 can be used suitably for the low-friction layer. The material for the low-friction layer is exposed to hot exhaust gases of 500° C. or higher while in service for the purpose described in this specification, and will be depleted by combustion. Therefore, great care must be taken so that no gap is formed between the supporting member and metallic can, after the low-friction layer is depleted. When the low-friction layer is to be formed on the mat of ceramic fibers indirectly via an adhesive layer, thickness of the low-friction layer (including that of the adhesive layer) is preferably 0.3 mm or less. It is more preferably 0.2 mm or less, still more preferably 0.1 mm or less, most preferably 0.05 mm or less, so long as the intrusion works are not hindered by insufficient thickness of the low-friction layer.

Examples of the low-friction layer include tapes adhesive on both sides, and low-friction films, e.g., commercial strippable paper carriers which are used as display labels for various purposes. A film for a tape adhesive on both sides and the strippable paper carrier thereon may be directly used as the adhesive and low-friction layers of the supporting member, respectively, for the present invention. Examples of this type of adhesive tape include Nicetack (produced by Nichiban).

Thus, the supporting member provided with a low-friction layer for the canning method of the present invention for a ceramic honeycomb structure is provided.

The method of the present invention for assembling, by intrusion, a ceramic honeycomb structure into a metallic can si effected by intruding the honeycomb structure held by a supporting member provided with a low-friction layer while applying a given pressure to the metallic can at each supporting member, and then sealing the metallic can by the ordinary method. The honeycomb structure is closely held by the supporting member on the upper and lower sides, with an adequate space between them. Channeling of exhaust gases can be effectively prevented, when the supporting member is provided with a projection at one longitudinal end at almost the center of the end side and a cavity at the other end (refer to FIG. 2) in such a way that the projection can fit in the cavity. It is necessary to assemble the honeycomb structure held by the supporting member into the metallic can in such a way to keep the supporting member compressed at an adequate pressure while in service, so as to prevent misalignment of the honeycomb structure. It is therefore preferable to separate the metallic can and honeycomb structure from each other at a clearance in a range from 30 to 85% of common thickness of the supporting member. This clearance, however, is one yardstick, because the relation between the clearance and supporting member thickness varies depending on various factors, e.g., mat material and purpose of the final member.

It goes without saying that the above relationship should be determined adequately by testing for a specific combination of these factors.

Rate at which the supporting member is intruded into the metallic can is normally in a range from 15 to 50 mm/s. At below 15 mm/s, the working efficiency is significantly poor for the commercial production. At above 50 mm/s, on the other hand, it is difficult to hold the supporting member at a given position, increasing defective products and impractical. Allowable misalignment of the supporting member in the metalliccan varies depending on size of the can. It is however preferable to keep the misalignment from the given position at 10 mm at the largest. A misalignment up to 20 mm may be permissible, depending on structure and dimensions of the can. Intrusion of the assembly of honeycomb structure and supporting member is aided by an intrusion jig. The jig preferably has a taper angle (θ) of around 2 to 10°, and roughness of the surface in contact with the supporting member is in a range from 0.8 to 12.5 μm as the average centerline roughness determined as per JIS B-0601, in order to facilitate the intrusion works.

The metallic can serves as the protective structure for the ceramic honeycomb structure, made of a material and having a shape and size suitable for a specific purpose, e.g., catalytic converter or heat exchanger. Its members may be monolithically attached by adequate means, e.g., welding or others which may or may not use bolts/nuts.

The ceramic honeycomb structure, which can be used as a member for a catalytic converter, heat exchanger or the like in an exhaust gas cleaning-up system for an internal combustion engine or the like, is securely and evenly held by the supporting member, when canned by the ceramic honeycomb intrusion method of the present invention, and is serviceable for an extended period even when exposed to high temperature, mechanical shocks generated by continuous vibration and other severe actual conditions.

EXAMPLES

The present invention is described by Examples and Comparative Examples below, which by no means limit the present invention.

(Examples)

Figure 2:
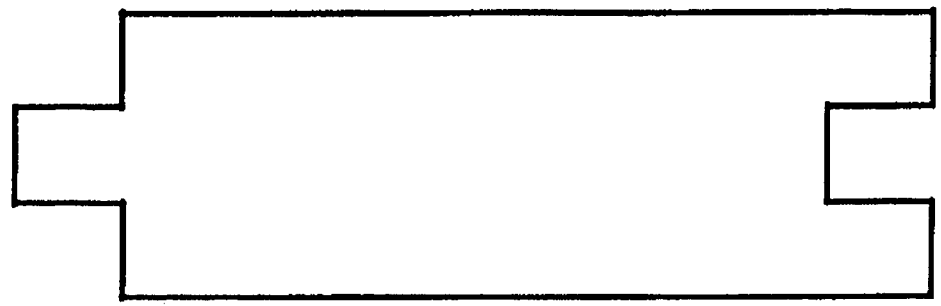
FIG. 2 shows the supporting member in plan view.

A ceramic honeycomb structure, 93 mm in diameter and 118 mm long, supporting a catalyst was held by a mat of ceramic fibers (Mitsubishi Chemical's Mufftec), having a shape as illustrated in FIG. 2, unit weight of 1200 g/m$^2$, dimensions of 344 mm in length, 103 mm in width and 7.0 mm in thickness, and a projection (40 mm long and 35 mm wide) at one longitudinal end at almost the center of the end side and a cavity (40 mm deep and 35 mm wide) at the other end in such a way that the projection could fit in the cavity. Each supporting member was provided with a low-friction layer of low-friction film shown in Table 1 via an adhesive layer. The honeycomb structure was closely held by the supporting member, leaving uncovered spaces, 10 mm long on the upper side and 5 mm long on the lower side, where the projection at one longitudinal end was fit in the cavity at the other end, with the joint immobilized by a 0.01 mm thick adhesive tape. This assembly of the honeycomb structure held by the supporting member was intruded in a metallic can formed for a catalytic converter, 98.8 mm in inner diameter, at an intrusion rate of 28 mm/s using an intrusion jig of S35C, having a section as illustrated in FIG. 1, taper angle of 5°, roughness of 1.6 μm (average centerline roughness determined as per JIS B-0601) on the surface in contact with the supporting member, and inner diameter 98.0 mm at the lower section, to prepare a catalytic converter. In FIG. 1 a carrier 1 (a honeycomb structure) is surrounded by a mat 2 and it is inserted in an intrusion jig 3. The jig 3 has an inside tapered portion 5 with a taper angle θ. A can 5 is placed below the jig 4 and the arrow A denotes the direction of pressure given for intrusion.

Misalignment of the supporting member, i.e., distance between its actual position and specified position, was measured for each catalytic converter thus prepared. The results are given in Table 1. The converter was disassembled to observe surface conditions of the supporting member. The assessment results are also given in Table 1 with remarks "good," "common," "bad," and "defective," where "good" means no irregularities observed on the supporting member surface, "common" no problem as a whole, although some irregularities are observed in places on the low-friction layer, "bad" exfoliation about to start on the low-friction layer, and "defective" some exfoliation observed on the low-friction layer and excessive misalignment of the layer also observed.

Each catalytic converter, prepared under the same conditions, was also vibration-tested at high temperature under the conditions described below. The results are also given in Table 1 with overall remarks "good," "common," and "defective," where "good" means the supporting member showing no abnormality, "common" the member deteriorated to some extent, and "defective" the member deteriorated partly or totally, and scattered to an extent that it could no longer hold the honeycomb structure.

For the vibration test, a hot gas kept at 900° C. was forcefully passed through each catalytic converter at 2.6 Nm$^3$/s for 20 h while it was exposed to vibration of 185 Hz and 60 G in the same direction of gas flow. The vibration test results are also given in Table 1 with remarks "good," "common," and "defective," where "good" means misalignment of the supporting member being less than 0.5 mm, "common" the misalignment being 0.5 mm or more but less than 1.0 mm, and "defective" the misalignment being 1.0 mm or more.

TABLE 1

| Examples | Types of film for low-friction layer | Static of efficient of low-friction layer | Maximum misalignment of supporting member | Appearance of supporting member | Results of vibration tests at high temperature | Overall assessment |
| --- | --- | --- | --- | --- | --- | --- |
| Example 1 | Film A | 0.087 | 2 mm | Good | Good | Good |
| Example 2 | Film B | 0.132 | 5 mm | Common | Good | Good |
| Comparative Example 1 | Film C | 0.176 | 15 mm | Bad | Common | Defective |
| Comparative Example 2 | Film D | 0.268 | 43 mm | Defective | Defective | Defective |

The canning method of the present invention allows the ceramic honeycomb structure held by the supporting member to be assembled in a metallic can at a higher rate and more smoothly than the conventional method by use of the low-friction layer on the supporting member. The assembly of honeycomb structure held by the supporting member suffers less misalignment, efficiently preventing local deterioration of the supporting member resulting from the misalignment, gas channeling resulting from uneven density of the supporting member in the can, the honeycomb structure from being worn or cracked due to external mechanical shock, and wind corrosion which may occur when the honeycomb structure is assembled by the clamshell method. As a result, the present invention gives a more durable ceramic honeycomb structure assembled in a metallic can.

What is claimed is:

1. A method for assembling a ceramic honeycomb structure into a metallic can, putting a support member for said structure between said structure and said metallic can, wherein said structure is wound closely with said supporting member and put into said can while compressing said supporting member which is coated with a low-friction layer on the surface in contact with said can.

2. A method of claim 1, wherein said low-friction layer on said supporting member has a static coefficient of friction of 0.15 or lower.

3. A method of claim 1, wherein said low-friction layer is formed by the one selected from the group consisting of paper, synthetic paper, paper impregnated with a synthetic resin, paper coated with a synthetic resin, paper impregnated with oil and synthetic paper impregnated with oil.

4. A method of claim 1, wherein said low-friction layer is formed on said supporting member directly or indirectly via an adhesive layer.

5. A method o f claim 1, wherein said low-friction layer has a thickness of 0.3 mm or less.

6. A method of claim 1, wherein said supporting member is composed of fibers of at least one type of ceramic material selected from the group consisting of alumina, silica, mullite, silicon carbide, silicon nitride and zirconia.

7. A method of claim 1, wherein said ceramic honeycomb structure is used as a catalyst carrier in an exhaust gas cleaning-up system, or as a particulate filter for a diesel engine.

8. A member comprising a ceramic honeycomb structure, metallic can which holds said structure and supporting member for said structure which is placed between said structure and metallic can in a compressed manner, wherein said supporting member is provided with a low-friction layer having a static coefficient of friction of 0.15 or lower on the surface in contact with said metallic can.

* * * * *

UNITED STATES PATENT AND TRADEMARK OFFICE
CERTIFICATE OF CORRECTION

PATENT NO. : 6,242,071 B1
DATED : June 5, 2001
INVENTOR(S) : Toshio Yamada et al.

It is certified that error appears in the above-identified patent and that said Letters Patent is hereby corrected as shown below:

<u>Title page,</u>
Item [30], correct the date of the priority application to March 30, 1998.

Signed and Sealed this

Twenty-ninth Day of January, 2002

Attest:

JAMES E. ROGAN
*Attesting Officer*  *Director of the United States Patent and Trademark Office*